(12) United States Patent
Rigollet et al.

(10) Patent No.: US 7,530,605 B2
(45) Date of Patent: May 12, 2009

(54) QUICK-CONNECT END FITTING

(75) Inventors: Nicolas Rigollet, Romorantin (FR);
Fabrice Prevot, Selles sur Cher (FR);
Tony Rointru, Marcilly En Vault (FR)

(73) Assignee: Etablissements Caillau,
Issy-les-Moulineaux (FR)

(*) Notice: Subject to any disclaimer, the term of this patent is extended or adjusted under 35 U.S.C. 154(b) by 381 days.

(21) Appl. No.: 10/557,704

(22) PCT Filed: May 26, 2004

(86) PCT No.: PCT/FR2004/001303

§ 371 (c)(1),
(2), (4) Date: Nov. 22, 2005

(87) PCT Pub. No.: WO2004/106799

PCT Pub. Date: Dec. 9, 2004

(65) Prior Publication Data

US 2007/0059972 A1    Mar. 15, 2007

(30) Foreign Application Priority Data

May 27, 2003    (FR) .................................. 03 06391

(51) Int. Cl.
*F16L 37/00*    (2006.01)
(52) U.S. Cl. .................... 285/305; 285/313; 285/321
(58) Field of Classification Search ................. 285/305, 285/308, 313, 317, 321
See application file for complete search history.

(56) References Cited

U.S. PATENT DOCUMENTS

| | | | |
|---|---|---|---|
| 3,314,696 A * | 4/1967 | Ferguson et al. ............. | 285/305 |
| 3,695,646 A | 10/1972 | Mommsen | |
| 3,753,582 A * | 8/1973 | Graham ....................... | 285/305 |
| 4,884,829 A * | 12/1989 | Funk et al. ................... | 285/305 |
| 5,273,323 A * | 12/1993 | Calmettes et al. ............ | 285/305 |
| 5,855,399 A * | 1/1999 | Profunser ..................... | 285/305 |
| 6,179,345 B1 * | 1/2001 | Gensert et al. ............... | 285/305 |
| 6,371,528 B1 * | 4/2002 | Kimura ........................ | 285/305 |
| 6,554,322 B2 * | 4/2003 | Duong et al. ................ | 285/305 |

(Continued)

FOREIGN PATENT DOCUMENTS

DE    196 03 506    6/1997

(Continued)

OTHER PUBLICATIONS

International Search Report No. PCT/FR2004/001303, dated Nov. 23, 2004, 3 pages.

*Primary Examiner*—David E Bochna
(74) *Attorney, Agent, or Firm*—Connolly Bove Lodge & Hutz LLP

(57) ABSTRACT

The coupling (10) comprises a body (16) suitable for being fitted onto a tube (12) in leaktight manner, and a locking clip (22) that is elastically deformable between a locking configuration in which at least one locking zone (24A, 24B) of the clip can catch on a catch surface (14) of the tube and an unlocking configuration. The clip (22) is disposed over the wall of the body (16), which wall is provided with at least one transverse slot (30A, 30B) through which the locking zone (24A, 24B) projects into the body when the clip is in the locking configuration, and with at least one setback (32A, 32B; 36A, 36B) provided at the end of the slot, a portion of the bottom of said setback forming an unlocking ramp (34A, 34B; 38A, 38B) on which an unlocking zone (35A, 35B; 37A, 37B) can slide in order to cause the clip to go from its locking configuration to its unlocking configuration. The width of the unlocking zone is greater than the width of the locking zone and than the width of the slot, but less than or equal to the width of the setback, said widths being measured axially.

20 Claims, 8 Drawing Sheets

U.S. PATENT DOCUMENTS

| | | | |
|---|---|---|---|
| 6,604,760 B2 * | 8/2003 | Cresswell et al. | 285/305 |
| 6,983,958 B2 * | 1/2006 | Rautureau | 285/305 |
| 6,997,486 B2 * | 2/2006 | Milhas | 285/305 |
| 7,201,403 B2 * | 4/2007 | Takayanagi et al. | 285/305 |
| 2002/0171241 A1 | 11/2002 | Minkler et al. | |

FOREIGN PATENT DOCUMENTS

| | | |
|---|---|---|
| DE | 197 42 041 | 3/1999 |

* cited by examiner

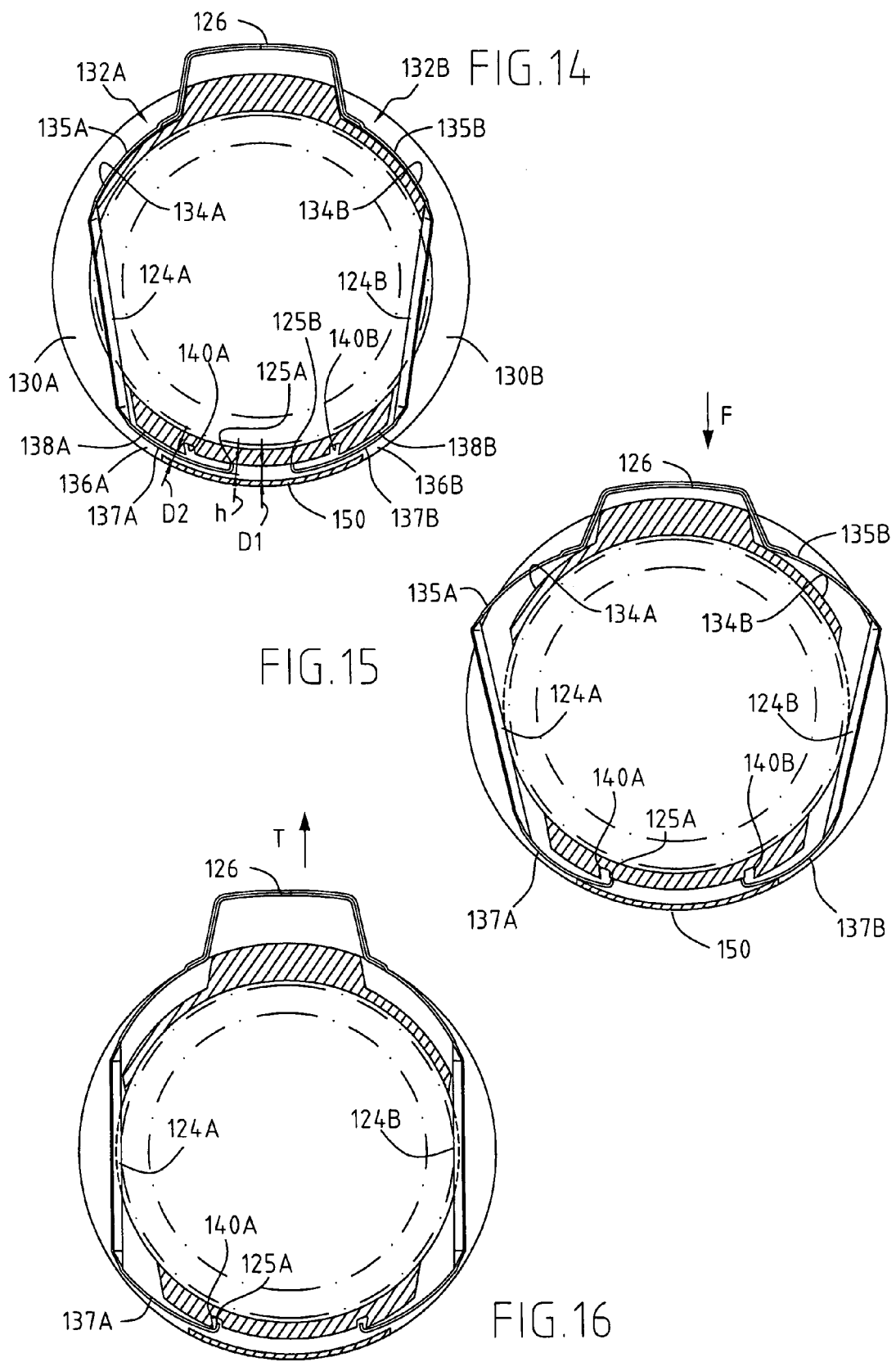

QUICK-CONNECT END FITTING

TECHNICAL FIELD

The present invention relates to a quick-connect coupling suitable for being fitted axially onto a tube which presents a substantially radial catch surface remote from its free end, the coupling comprising a body suitable for co-operating with sealing means for establishing a leaktight connection with the tube, and a locking clip which is retained axially relative to the body and which presents at least one locking zone, the clip being such that, starting from a locking configuration in which it is suitable for co-operating with the catch surface of the tube in order to retain said tube, said clip is suitable for being deformed to take up an unlocking configuration.

BACKGROUND ART

Quick-connect couplings of this type are known, for example, from EP 0 911 565, and WO 02/08656.

In such a coupling, the locking clip, also referred to as the "locking ring", has an oblong shape and is disposed inside the body of the coupling, the wall of said coupling being provided with an opening through which an unlocking bridge that is part of the locking clip projects. Going from the locking configuration to the unlocking configuration is obtained by pushing on said bridge, thereby driving apart the two diametrically opposite locking zones on the locking clip.

Such couplings are entirely satisfactory, but mounting the clip inside the body sometimes gives rise to difficulties. In addition, recesses must be provided inside the body in order to accommodate the locking zones when the clip is in the unlocking configuration. In order to limit the radial dimensions of the body of the coupling, the locking zones must, if possible, have small radial thicknesses in order to be accommodated easily in said recesses.

In addition, the deformation of the clip while it is going from its locking configuration to its unlocking configuration is entirely dictated by the mechanical properties of said clip, without being guided by any element that is part of the body of the coupling.

However, the couplings of EP 0 911 565 and WO 02/08656 offer the advantage of protecting the locking zones of the locking clip, insofar as said locking zones are disposed inside the body of the coupling. The risks of untimely unlocking, and the risks of degradation or damage being suffered by certain portions of the clip, in particular its locking zones and those portions of the clip which are adjacent to said zones, are thus practically eliminated.

SUMMARY OF DISCLOSURE

An object of the present invention is to provide a quick-connect coupling which preserves the above-mentioned advantages as regards protecting the clip, while also removing, or at least strongly attenuating, the above-mentioned drawbacks.

This object is achieved by the fact that the clip is disposed over the wall of the body, which wall is provided with at least one transverse slot through which the locking zone projects into the body when the clip is in the locking configuration, and with at least one setback provided at one end of the slot, said setback having a bottom portion formed on the edge of the slot, by the fact that the clip has at least one unlocking zone which is situated at one end of the locking zone and whose width is greater than the width of said locking zone and than the width of the slot, but less than or equal to the width of the setback, said widths being measured axially, and by the fact that said bottom portion of the setback forms an unlocking ramp on which the unlocking zone is suitable for sliding in order to cause the clip to go from its locking configuration to its unlocking configuration.

With the invention, the clip is easy to put in place over the body of the coupling and, in any event, the quality of its positioning relative to the coupling is detectable by the user, since said clip is disposed over the wall of the body. The unlocking zone of the clip is received in the setback, so that said unlocking zone is protected against any mishandling or any risks of snagging on elements external to the connection. In addition, deformation of the clip as it goes from the locking configuration to the unlocking configuration is controlled excellently, since it is conditioned by the unlocking zone sliding over the unlocking ramp.

Advantageously, the bottom portion of the setback forming the unlocking ramp is provided on the edge of the slot, on both sides thereof, and the unlocking zone extends axially on both sides of the locking zone.

These configurations facilitate guiding the clip as it is being deformed between its locking and unlocking configurations, and they limit the risks of the clip tilting relative to a plane that is transverse to the axial direction of the connection.

In a particularly advantageous embodiment, the clip is formed from a strip of metal, the locking zone being formed by a region of said strip in which two strip portions situated on either side of a fold extending along the length of the strip are folded over one against the other.

The clip is thus formed very simply and at low cost. Although the width of the locking zone is small, the quantity of metal present in said zone is large, because it is made up of the two strip portions on either side of the above-mentioned fold. Thus, in the locking zone, the strength of the clip is sufficient for the clip to put up a large amount of resistance to tear forces tending to tear the tube away from the coupling and for the locking zone to be relatively rigid and, in particular, not to deform or hardly to deform while the clip is being deformed between its locking and its unlocking configurations. The area of contact between the lip and the catch surface on the tube is increased, offering the advantage of distributing the stresses better between the two elements.

Advantageously, the metal chosen for making the above-mentioned metal strip is spring steel, it being possible for the clip to be shaped, in particular as regards the particular shape of the locking zone before said steel is quench hardened. It can also be made of stainless steel.

In yet another advantageous embodiment, the clip is formed from a metal wire, at least a portion of which is flattened to define the locking zone.

This configuration is also advantageous, in particular as regards the strength of the clip in the locking zone.

Advantageously, the clip presents at least one additional unlocking zone situated at the other end of the locking zone, at least one additional unlocking ramp is provided at the other end of the slot, the unlocking zone is suitable for sliding on the unlocking ramp so as to cause the clip to go into a first unlocking configuration, while the additional unlocking zone is suitable for sliding on the additional unlocking ramp so as to cause the clip to go into a second unlocking configuration.

The clip thus has two distinct unlocking configurations. For example, one of said configurations can be obtained by means of a very simple action, optionally with a tool, on the clip when said clip is in its locking configuration, so as to obtain quick and easy unlocking of the connection. The other unlocking configuration can be a standby configuration, in which the clip can be placed before the coupling is fitted onto the tube for the purpose of forming the connection. Once this fitting has been achieved, and by means of a very simple action, the clip can be cause to go from its second unlocking configuration to its locking configuration.

Advantageously, the body of the coupling presents two transverse slots situated facing each other, at least one setback whose bottom portion forms an unlocking ramp being provided at one end of each slot, while the clip presents two locking zones, each of which is engaged in one of said slots, and at least one unlocking zone for each locking zone.

Advantageously, the clip is substantially U-shaped, its two branches being terminated by free ends and being interconnected by a bridge opposite from said ends.

The geometrical shape of the clip is simple and it having this U-shape makes it easier to put in place over the wall of the body of the coupling. Elastic deformation of the clip between its locking and its unlocking configurations can also be made easier by the fact that those ends of the branches which are opposite from the bridge are free ends.

Advantageously, the clip is suitable for presenting a pull unlocking configuration into which it is brought, from its locking configuration, by traction being exerted substantially in a transverse plane, and in that the coupling has means for limiting the extent to which the clip can be moved by pulling.

Preferably, said means comprise a blocking surface formed at one end of the unlocking ramp on which an unlocking zone slides during said pulling.

The invention also provides a quick-connect coupling suitable for being fitted axially onto a tube which presents a substantially radial catch surface remote from its free end, the coupling comprising a body suitable for co-operating with sealing means for establishing a leaktight connection with the tube, and a locking clip which is retained axially relative to the body and which comprises two branches interconnected by a bridge, each of which branches is provided with a locking zone, said clip being such that, starting from a locking configuration in which the bridge projects radially towards the outside of the body of the coupling and in which said locking zones project into the body and are suitable for co-operating with the catch surface of the tube in order to retain said tube, said clip is suitable for being deformed elastically by means of pressure being exerted on the bridge to take up a push unlocking configuration in which said branches are driven apart.

Couplings of this type are known, for example, from EP 0 911 565 and WO 02/08656. As indicated above, such known couplings are generally satisfactory, but they suffer from drawbacks related to putting the clip in place inside the body of the coupling, to the need to provide, inside said body, a recess that is large enough to accommodate the locking zones when the clip is in the unlocking configuration, or indeed to the resulting limitations in the radial dimensions of the locking zone of the clip.

In addition, in such known couplings, the only possibility for causing the clip to go from its locking configuration to its unlocking configuration is to exert pressure on the bridge. Connections of this type are in general assembled in cluttered environments in which access is limited, such as the engine compartment of a vehicle. In addition, environments of that type are often soiled, e.g. with grease and dust, fuel, or other dirt, which can make the bridge of the clip slippery or which can become lodged under said bridge.

As a result, it is sometimes difficult to apply the desired pressure to the bridge for the purpose of unlocking the connection. However, the possibility of unlocking the clip merely by pushing on the bridge remains desirable because it is very simple to implement in many situations.

An object of the present invention is to remedy those drawbacks, or at last to attenuate them.

This object is achieved by the fact that the clip is disposed over the wall of the body, which wall is provided with two transverse slots, through each of which one of the locking zones projects into the body when the clip is in the locking configuration, by the fact that, for each slot, the body presents a push unlocking ramp situated at one end of the slot and a pull unlocking ramp situated at the other end of the slot, and by the fact that, for each locking zone, the clip presents a push unlocking zone situated at one end of the locking zone of the bridge and a pull unlocking zone situated at the other end of the locking zone, so that, starting from said locking configuration, the clip is suitable for being elastically deformed by pressure being exerted on the bridge so as to take up said push unlocking configuration by sliding the push unlocking zones on the push unlocking ramps, and for being elastically deformed by traction being exerted on the bridge so as to take up, in addition, a pull unlocking configuration by sliding the pull unlocking zones on the pull unlocking ramps.

Thus, in the invention, there are two possibilities for causing the clip to go from its locking configuration to its unlocking configuration: either by applying pressure to the bridge, or by applying traction thereto. Unlocking can be performed manually in both cases or else by means of a simple tool. For example, the traction force can be applied by sliding the flat of a screwdriver under the bridge and by using said screwdriver as a lever. It is naturally also possible to use a pair of pliers.

Advantageously, at least one of the unlocking configurations is stable, the coupling having means for holding the clip in this stable configuration.

This stable unlocking configuration can be used in a standby situation, before the coupling is fitted onto the tube. Fitting is thus particularly easy because the locking zones of the clip do not form any obstacle to the catch surface of the tube passing into the coupling and, once fitting is achieved, it suffices to manipulate the clip in order to bring it from this stable unlocking configuration to the locking configuration.

Advantageously, the stable unlocking configuration is the pull unlocking configuration and, in order to cause the clip to go from this configuration to its locking configuration, it suffices merely to push the bridge through a small amplitude.

Advantageously, the clip is substantially U-shaped, its two branches being terminated by free ends and being interconnected by said bridge which is opposite from said ends.

This simple geometric shape facilitates putting the clip in place over the body of the coupling and imparts the desired resilience to it.

Advantageously, the free ends of the clip are folded back, and the wall of the body of the coupling is provided with retaining setbacks in which said folded-back free ends are retained in the pull unlocking configuration.

These retaining setbacks and the particular configuration of the free ends of the clip make it possible to obtain the stable pull unlocking configuration.

Advantageously, the free ends of the clip are folded back and they form the pull unlocking zones.

Advantageously, the body of the coupling is provided with accommodation setbacks in which the free ends of the clip are received over their entire strokes between the locking configuration and the push unlocking configuration of the clip.

In which case, advantageously, the body of the coupling has a wall element under which the free ends of the clip are disposed.

The free ends of the clip are thus protected against any mishandling and against any risk of snagging on an element external to the connection.

The invention will be well understood and its advantages will appear more clearly on reading the following detailed description of embodiments shown by way of non-limiting example.

BRIEF DESCRIPTION OF DRAWINGS

The description refers to the accompanying drawings, in which:

FIG. 14 is a cross-section view on line XIV-XIV of FIG. 13, showing the clip in its locking configuration; and FIGS. 15 and 16 are cross-section views analogous to the cross-section view of FIG. 14, showing the clip respectively in its push unlocking position and in its pull unlocking position.

DESCRIPTION OF BEST AND VARIOUS EMBODIMENTS FOR CARRYING OUT DISCLOSURE

Figure 1:
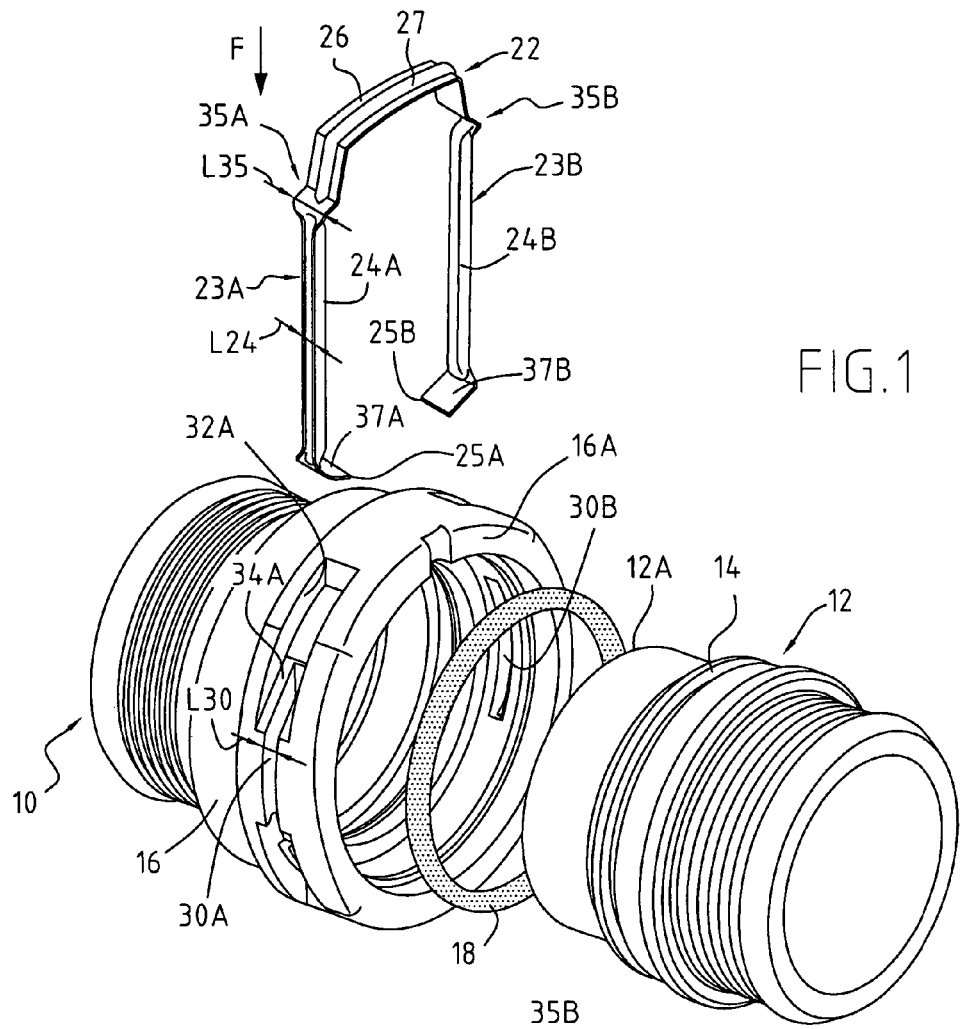
FIG. 1 is a perspective view of a connection including a first embodiment of a coupling of the invention prior to fully assembly and connection of the coupling with the tube.
Figure 2:
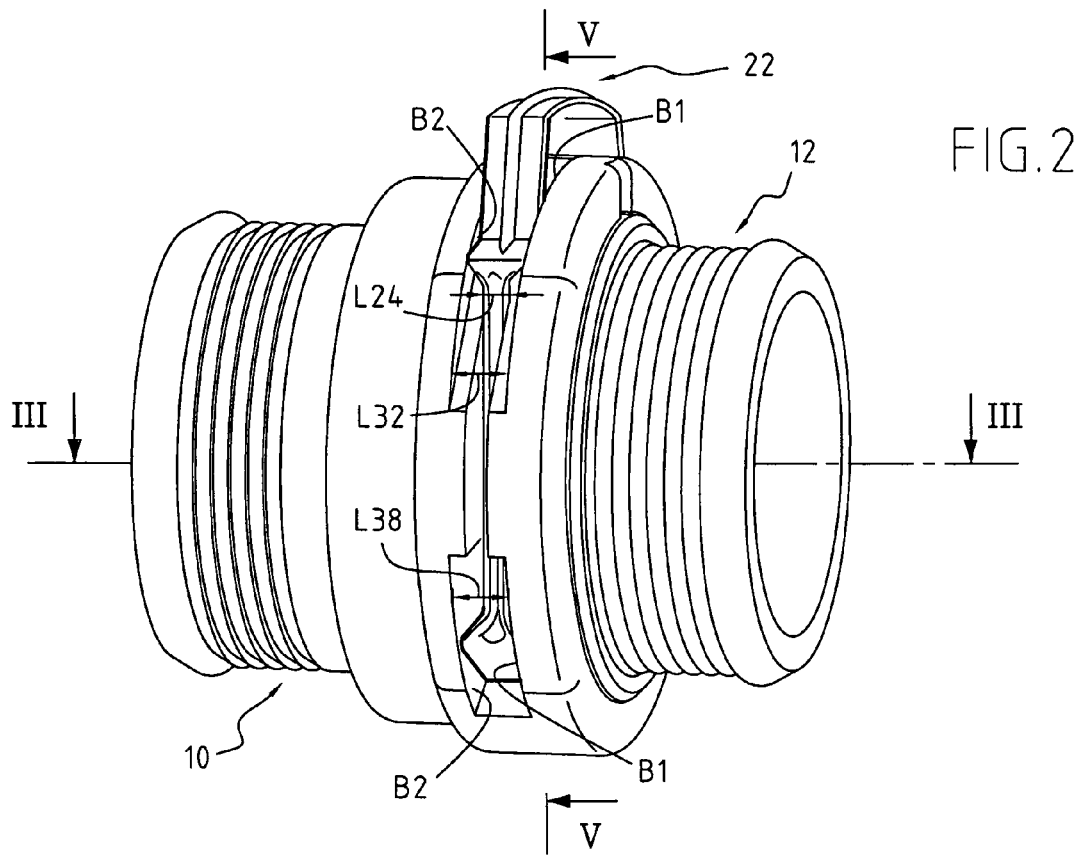
FIG. 2 is a perspective view of the connection of FIG. 1, as assembled.
Figure 3:
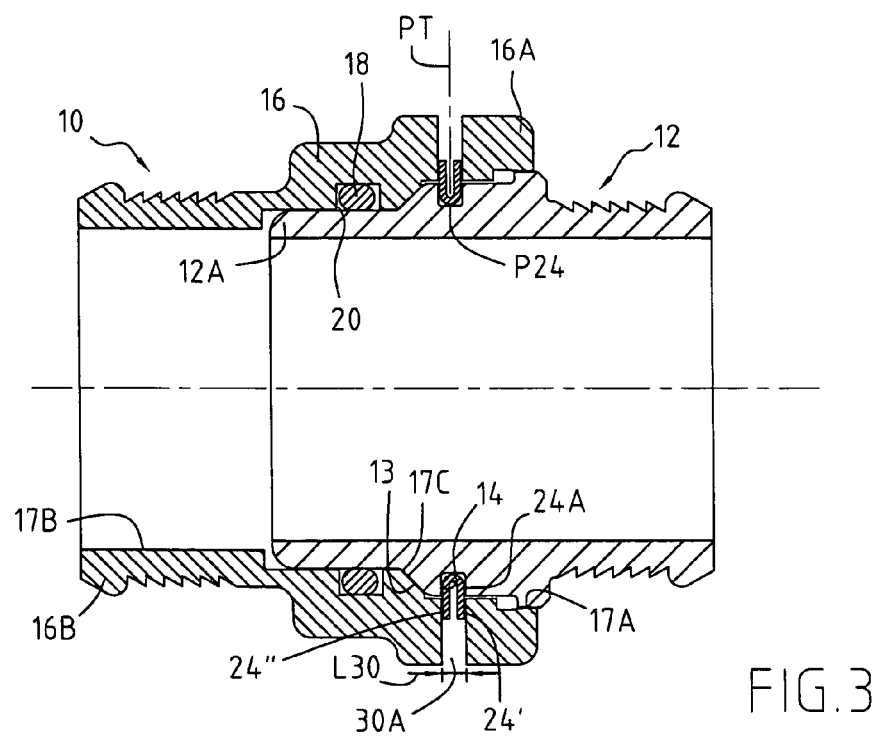
FIG. 3 is an axial section view in the plane III-III of FIG. 2.

Firstly, FIGS. 1 to 3 are described below. They show the coupling 10 of the connection and the tube 12 onto which it is fitted. The tube presents a substantially radial catch surface 14 that is remote from its free end 12A.

The coupling 10 comprises a body 16 inside which the tube 12 can be fitted. In the fitted position shown in FIGS. 2 and 3, the connection between the tube and the coupling is leaktight. To this end, an O-ring sealing gasket 18 is disposed between the wall of the body of the coupling 16 and the wall of the tube 12. For example, a groove 20 is provided in the inside wall of the body of the coupling for the purpose of receiving said gasket 18, so that said gasket co-operates with an axial portion of the wall of the tube 12 when said tube is fitted into the coupling.

The coupling further comprises a locking clip 22 which, as can be seen more clearly in FIG. 2 is disposed over the wall of the body 16 of the coupling while being retained axially relative to said body. Said clip presents two locking zones 24A and 24B. FIG. 1 shows that the clip is substantially U-shaped, with two branches 23A and 23B on which the above-mentioned locking zones are formed, said two branches being terminated by free ends, respectively 25A and 25B, and being interconnected by a bridge 26 opposite from said free ends.

Figure 8:
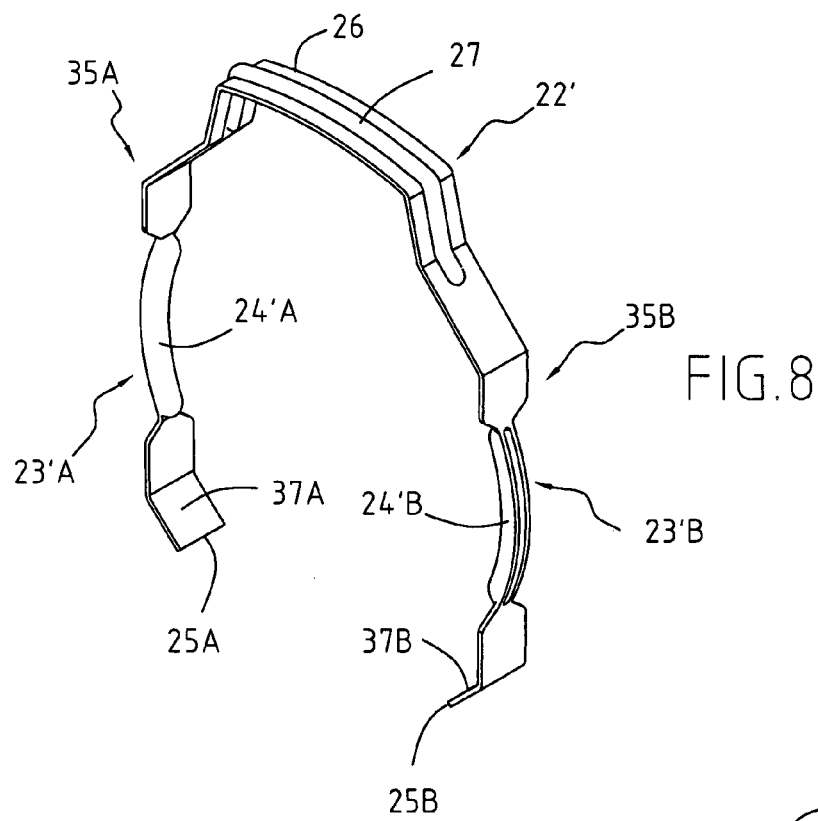
FIGS. 8 to 10 are perspective views of variant embodiments of a clip.

In the example shown in FIGS. 1 to 3, the two branches are substantially rectilinear. As shown in FIG. 8, it is, however, possible to use a clip 22' whose branches 23'A and 23'B are, at least in the regions of the locking zones 24'A and 24'B, slightly arcuate so as to fit substantially snugly around portions of the outline of the tube 12 when in the locking configuration.

The bridge 26 can be reinforced by a rib 27.

Figure 5:
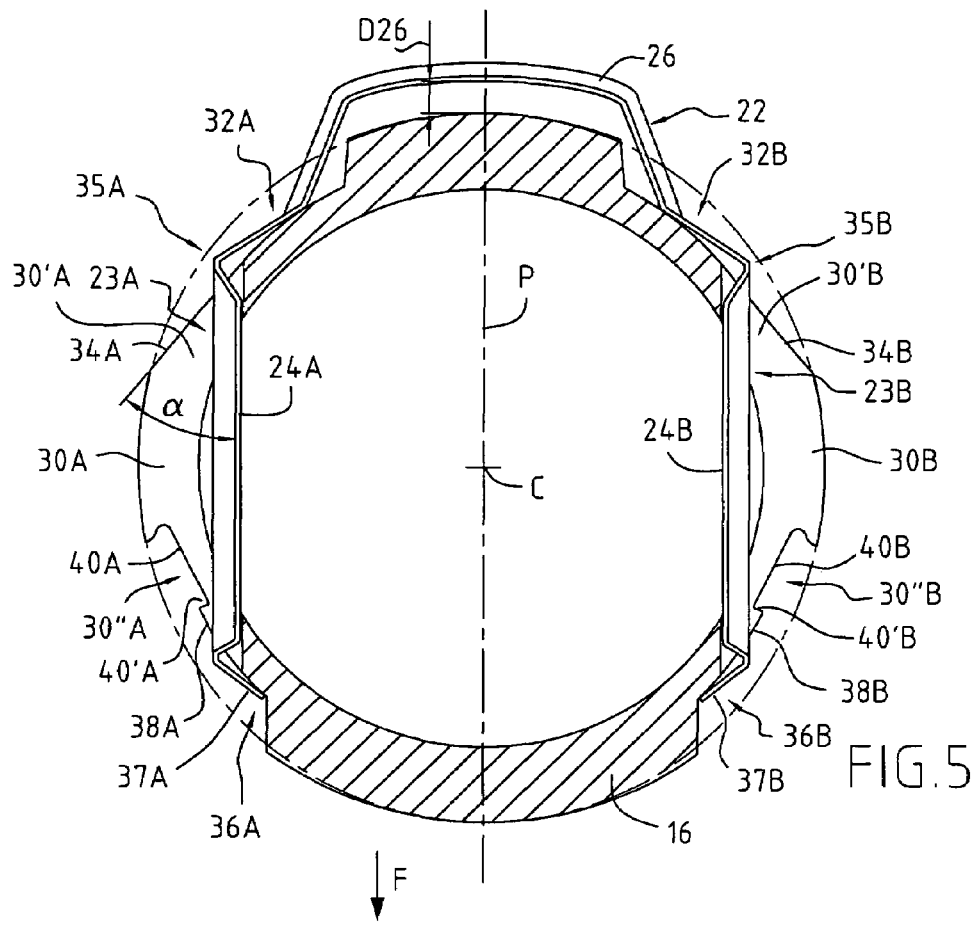
FIG. 5 is a cross-section view in the plane V-V of FIG. 2, showing the clip in its locking configuration.

When the clip is in the rest position, the two branches 23A and 23B can be substantially mutually parallel or can converge slightly going towards their free ends 25A, 25B. As can be seen in FIG. 5, when the clip 22 is in the locking configuration, the locking zones 24A and 24B project into the body 16 of the coupling. In this configuration, they can catch behind the shoulder 14 of the tube 12 so as to retain said tube inside the coupling. It should be noted that, between its free end 12A an its shoulder 14, the tube presents a ramp 13 which, while the tube is being inserted into the coupling, tends to drive the locking zones 24A and 24B of the clip apart in order to enable the tube to be fitted into the coupling even if said clip is in its locking configuration. The locking configuration of the clip can correspond to its rest position. However, preferably, in its locking configuration, its branches are stressed against the tube, i.e. the tube drives the branches apart slightly relative to the rest position that they would be in naturally in the absence of the tube.

For fitting the tube 12, it is inserted into the body 16 via the end 16A thereof. The clip 22 is disposed on the body such that its locking zones project into a first portion 17A of the cavity that is provided inside the body 16, said first portion, which is of circular cross-section, having radial dimensions suitable for receiving the tube with its shoulder 14. The groove 20 in which the gasket 18 is disposed is provided in a second portion 17B of the cavity in the body 16, which second portion is of radial dimensions that are smaller. The first portion 17A of said cavity opens out at the end 16A of the body of the coupling, and is separated from the second portion by a shoulder or by a ramp 17C forming an abutment for the above-mentioned ramp 13 in the tube.

The wall of the body 16 is provided with two slots, respectively 30A and 30B, through which the locking zones 24A and 24B of the clip respectively project into the portion 17A of the cavity, when said clip is in its locking configuration. The two slots 30A and 30B are diametrically opposite and extend transversely relative to the axial direction of the coupling. In its end axial portion corresponding to the first portion 17A of the cavity, the outside wall of the body of the coupling is in the overall shape of a cylinder whose base is circular or optionally slightly oblong. The two slots 30A and 30B open out into the first portion 17A of the cavity and onto said outside wall, whose outline is indicated in dashed lines in FIGS. 5 to 7.

In order to simplify the following description with reference to FIG. 1, it is assumed that the clip 22 is put in place on the body of the coupling by being moved vertically downwards as indicated by arrow F. With this convention, references 30'A and 30'B designate respective ones of the top ends of the slots 30A and 30B, and references 30"A and 30"B designate respective ones of the bottom ends of said slots.

The outside wall of the body of the coupling presents setbacks 32A and 32B provided at respective ones of the top ends of the slots 30A and 30B. The bottoms of the setbacks are formed in part on the edges of the slots, at the ends of which they are respectively provided. Thus, a portion of the bottom of the setback 32A is formed by an unlocking ramp 34A disposed on the top edge of the slot 30, on both sides thereof. Similarly, a portion of the bottom of the setback 32B is formed by an unlocking ramp 34B that extends on the top edge of the slot 30B, on both sides thereof. In the example shown, the ramps 34A and 34B are rectilinear and form an angle α of about 40° relative to the vertical direction parallel to a plane of symmetry P of the coupling. In general, said angle α can lie in the range 25° to 60°, the inclination of the ramps determining the spacing between the locking zones 24A and 24B of the clip at the end of the unlocking stroke.

The clip 22 has unlocking zones, respectively 35A and 35B, the unlocking zone 35A being situated at the top end of the locking zone 24A, between said locking zone 24A and the bridge 26, while the unlocking zone 35B is situated at the top end of the locking zone 24B, between said locking zone 24B and the bridge 26.

Figure 6:
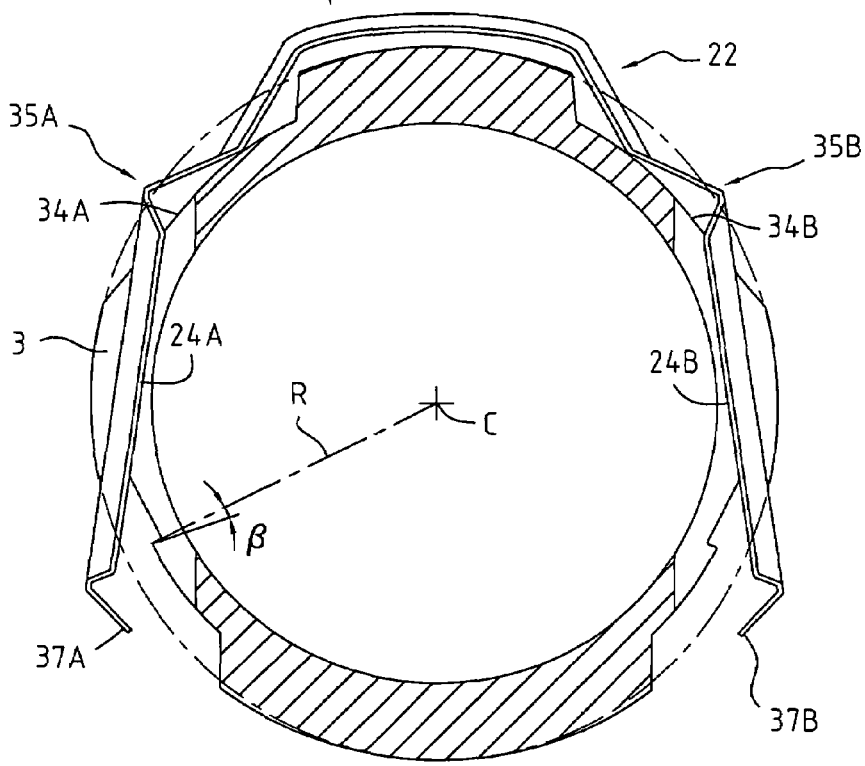
FIGS. 6 and 7 are section views analogous to the section views of FIG. 5, respectively showing the clip in its push unlocking configuration and in its pull unlocking configuration.

FIG. 5 shows that the bridge 26 projects radially relative to the coupling body 16 from which it is separated by a distance D26 when the clip is in the locking configuration. When pressure is exerted on the bridge as indicated by arrow F, said bridge can move downwards while moving closer to the outside wall of the body of the coupling and, during this movement, the unlocking zones 35A and 35B of the clip slide on the ramps 34A and 34B of the body of the coupling, thereby driving the branches 23A and 23B apart, and thereby retracting the locking zones 24A and 24B into the thickness of the wall of the body of the coupling as can be seen in FIG. 6. Below, this unlocking configuration is referred to as the "push unlocking configuration", the ramps 34A and 34B being "push unlocking ramps" and the zones 35A and 35B of the clip being referred to as "push unlocking zones".

It can be seen that these push unlocking zones remain substantially received in the setbacks 32A and 32B both when the clip is in the locking configuration and when it is in the push unlocking configuration.

In order to slide on the ramps 34A and 34B without penetrating into the slots 30A and 30B, each of the push unlocking zones 35A and 35B has a width L35 that is greater than the width L24 of the corresponding locking zone 24A, 24B, and that is greater than the width L30 of the corresponding slot 30A, 30B, but that is less than or equal to the width L32 of the corresponding setback 32A, 32B. In the example shown, the coupling is symmetrical about the plane P so that the elements of the clip or of the body of the coupling that are situated in register on either side of said plane are of equal width.

The outside wall of the body of the coupling also has other setbacks, respectively 36A and 36B, which are situated at the bottom ends 30"A and 30"B of the slots 30A and 30B. The bottoms of these setbacks are also formed in part by the respective edges of said slots. Thus, a bottom portion of the setback 36A forms a ramp 38A provided on the edge of the slot 30A, at the bottom end 30"A thereof, on both sides of said slot, and a portion of the bottom of the setback 36B is formed by a ramp 38B which is formed in the same manner on the edge of the slot 30B.

In order to co-operate with said ramps, the clip presents unlocking zones, respectively 37A and 37B, which are formed at the bottom ends of the locking zones 24A and 24B of the clip, i.e., in this example, at the free ends 25A and 25B of said clip. In other words, said unlocking zones 37A and 37B are situated on the other side of the locking zones 24A and 24B from the side thereof on which the bridge 26 is situated. It can be understood that, starting from the locking configuration shown in FIG. 5, it is possible to exert traction on the bridge 26 in the direction indicated by arrow T, in order to slide the unlocking zones 37A and 37B on the unlocking ramps 38A and 38B so as to bring the clip into its "pull unlocking configuration" shown in FIG. 7. The ramps 38A and 38B are thus referred to as "pull unlocking ramps", and the unlocking zones 37A, 37B are referred to as "pull unlocking zones".

Figure 4:
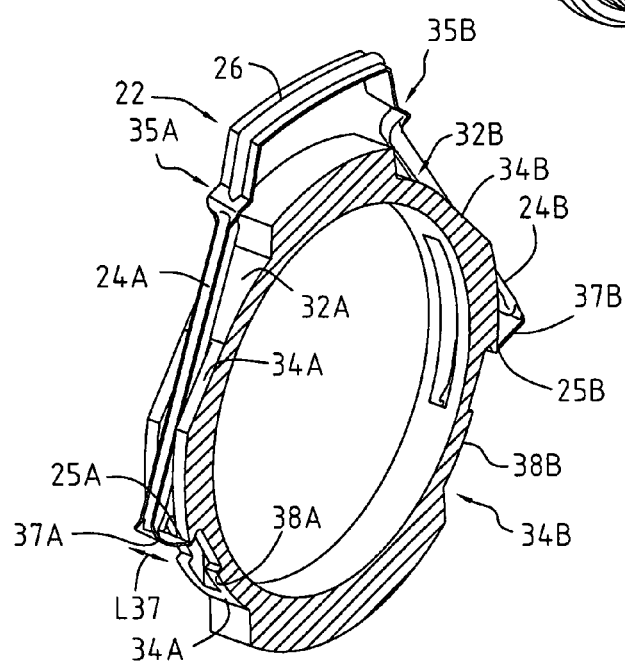
FIG. 4 is a perspective view showing only that axial segment of the body of the coupling with which the locking clip co-operates, and said clip while it is being mounted on said body.

While the clip is deforming as it goes from its locking configuration to its pull unlocking configuration, the pull unlocking zones 37A and 37B slide on the ramps 38A and 28B, and the width L37 of said unlocking zones is greater than the width L24 of the locking zones, and than the width L30 of the slots. It is less than or equal to the width L38 of the setbacks 38A and 38B. In this example, the setbacks 32A and 38A firstly and the setbacks 32B and 38B secondly are situated in the same axial segment of the body of the coupling, and their widths L32 and L38 are the same. The front transverse edges B1 of said setbacks, in the vicinity of the free end 16A of the body of the coupling are situated in the same transverse plane of the body, and the rear transverse edges B2 of said setbacks are situated in the same transverse plane, these two transverse planes defining between them the above-mentioned axial segment shown in FIG. 4. It can be seen that the pull unlocking zones 37A and 37B of the clip are received in the setbacks 38A and 38B in the locking configuration and in the pull unlocking configuration.

The above-mentioned edges B1 and B2 of the setbacks thus serve to retain the clip axially relative to the body 16, i.e. to prevent said clip from being torn off in the axial direction A.

If the clip can be unlocked only by being pulled, by using only the pull unlocking zones 37A and 37B and the setbacks 38A and 38B, then the distance D26 between the bridge 26 and the body of the coupling can be reduced almost to zero.

Advantageously, the width of the locking zone(s) of the clip is at the most substantially equal to one half of the width of the unlocking zones. In the example shown, the width L24 of the locking zones is about one third of the width L35 and L37 of the unlocking zones, the widths L35 and L37 being equal.

It is indicated above that the coupling is symmetrical about the plane P that contains the axial direction A of said coupling and the vertical direction. The clip is not only symmetrical about said plane but also about a transverse plane PT (see FIG. 3). It can be seen, in particular, that the unlocking zones extend, in the axial direction, on either side of the clip relative to the locking zones. In the example shown, the clip 22 is formed from a strip of metal that initially has the width L35 or L37 (these two widths being equal). The locking zones 24A and 24B are formed by regions of said strip in which two portions of the strip, respectively 24' and 24" situated on either side of a fold P24 extending along the length of the strip, are folded over one against the other. The fold P24 extends in the transverse plane PT.

In a variant, the unlocking zones can be formed by stamping, consisting in locally deforming each branch towards the other branch, as in the example shown in FIG. 8.

Figure 9:
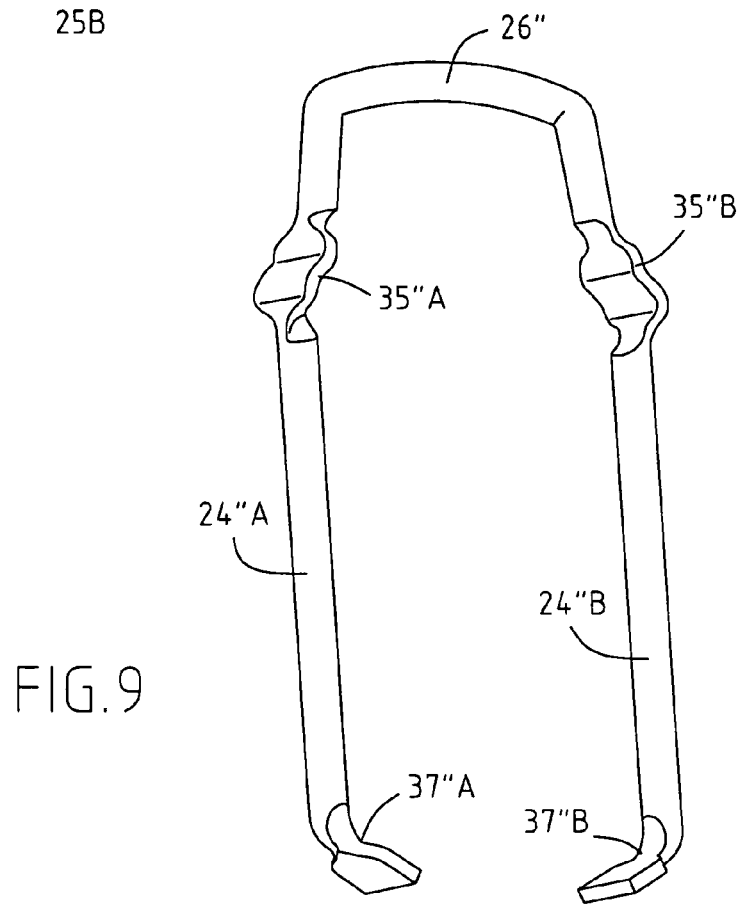

FIG. 9 shows a variant for a clip 22" made from a metal wire. The locking zones 24"A, 24"B extend between flattened portions of said wire. In this example, the locking zones have the same section as the wire, whereas the flattened portions form the unlocking ramps 35"A and 35"B (close to the bridge 26") and 37"A and 37"B (close to the free ends of the clip). Each locking zone is thus delimited between two flattened portions.

Alternatively, the locking zones could be formed by flattened portions (in which case the flattened portions would be formed parallel to the plane of the clip in order to reduce the width of the locking zones, whereas in FIG. 9 they are formed perpendicularly to said plane), while the unlocking zones keep the same section as the remainder of the wire.

Figure 10:
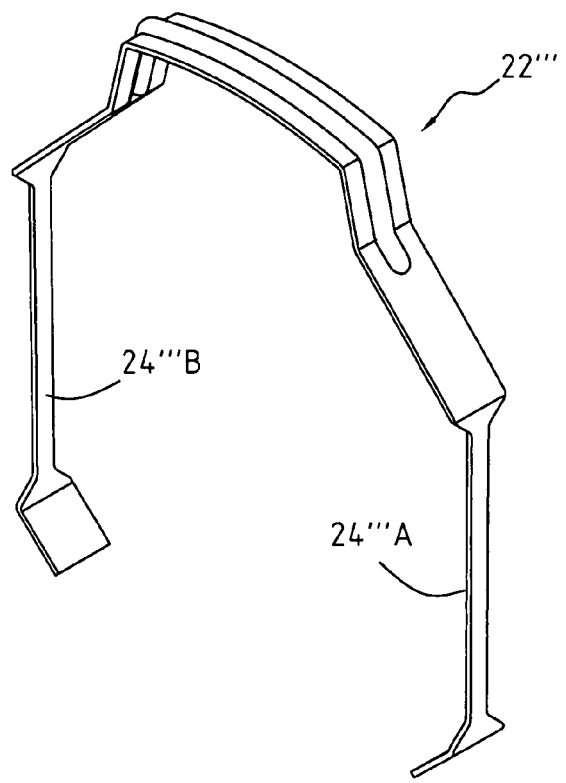

FIG. 10 shows another variant for a clip 22'' made from a strip cut back along its edges so as provide the locking zones 24'''A and 24'''B, of width less than the ordinary width of the strip. The same strip shape could be obtained by molding.

Figure 7:
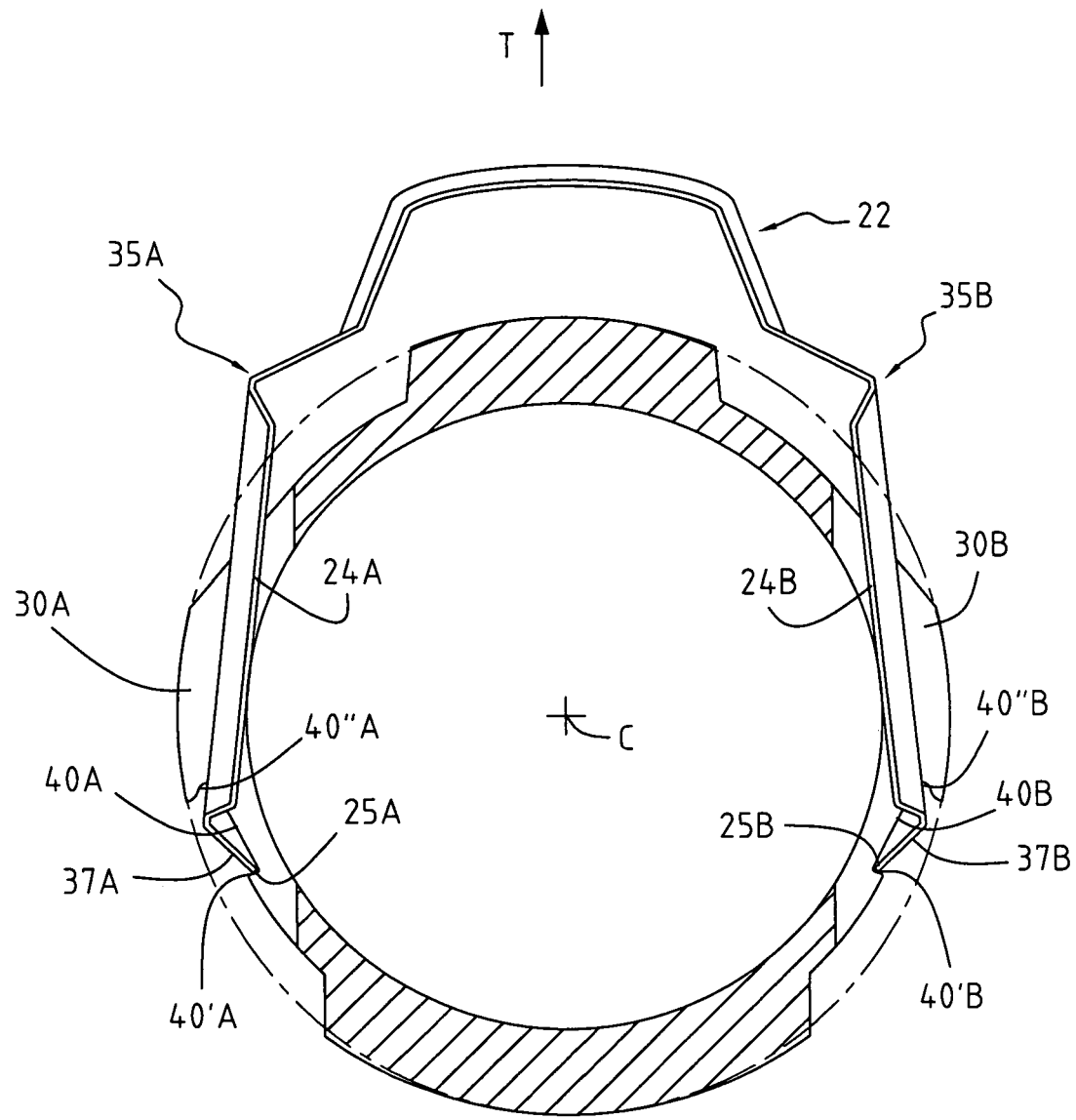

In the embodiment shown in FIGS. 1 to 7, the pull unlocking configuration is stable. The wall of the body of the coupling is provided with retaining setbacks, respectively 40A and 40B, in which the folded-back free ends 25A and 25B of the clip are retained when in the pull unlocking configuration as shown in FIG. 7. In the example shown, each of said retaining setbacks is formed by a recess provided in the bottom of a respective one of the setbacks 36A and 36B, on the edge of the corresponding ramp 30A, 30B.

When, starting from its locking configuration shown in FIG. 5, the clip is driven by pulling on the bridge to go into its pull unlocking configuration, the free ends of said clip slide firstly on first portions of the ramps 38A and 38B, in which portions said recesses are not provided, until they come to be received in the recesses 40A and 40B so as to be retained naturally therein. The bottom edges 40'A and 40'B of said recesses, which edges connect them to the ordinary portions of the ramps 38A and 38B, are sufficiently shallowly inclined (angle β) relative to a radius R extending from the geometrical center C of the coupling to enable the free ends 25A and 25B of the clip to be disengaged easily from the recesses 40A and 40B when pressure is exerted on the bridge 26.

The top edges 40''A and 40''B of said recesses, which edges connect them to the edges of the slots 30A and 30B, form blocking surfaces that retain the unlocking zones 37A and 37B in the recesses so as to prevent the clip from being moved any further by being pulled in the direction T.

The clip can thus be removed only by driving its branches apart, which requires a tool to be used.

The setbacks 36A and 36B form setbacks for receiving the free ends 25A and 25B of the clip in its locking configuration.

Said ends 25A and 25B, and the unlocking zones 37A and 37B of the embodiment of FIGS. 1 to 7 are folded back towards the inside of the clip relative to the locking zones 24A and 24B. In other words, the unlocking zones 37A and 37B extend towards each other.

Figure 11:
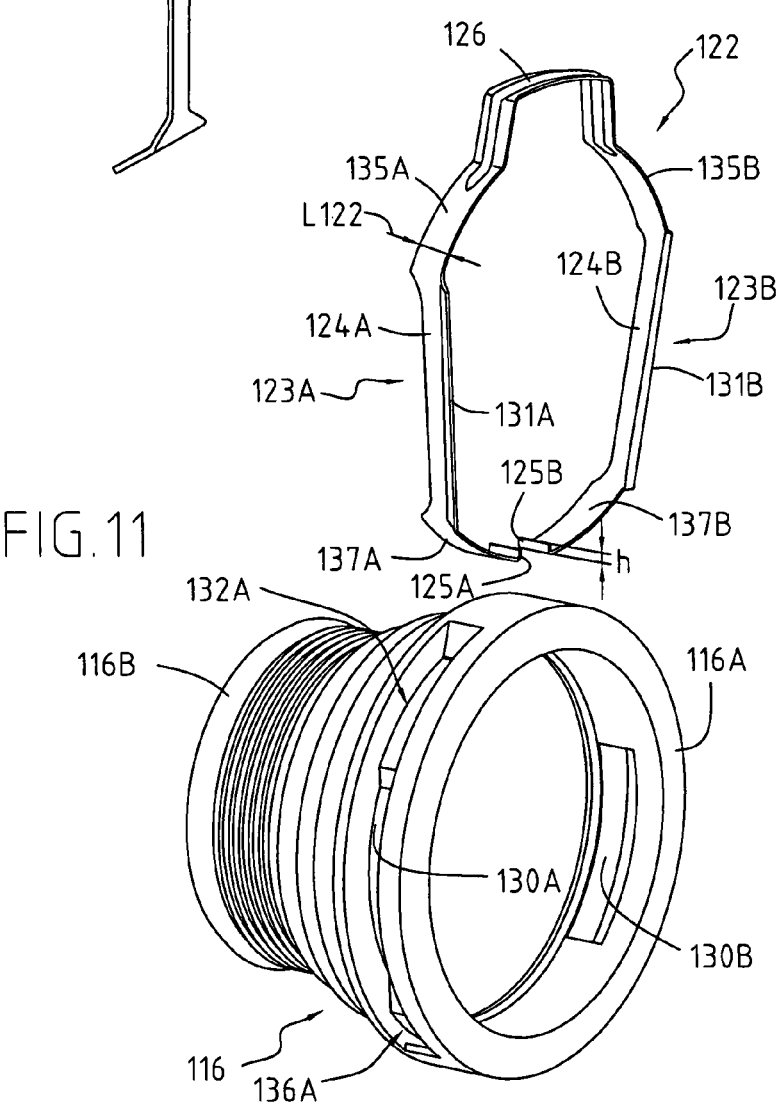
FIG. 11 is a perspective view of a second embodiment of a coupling.
Figure 13:
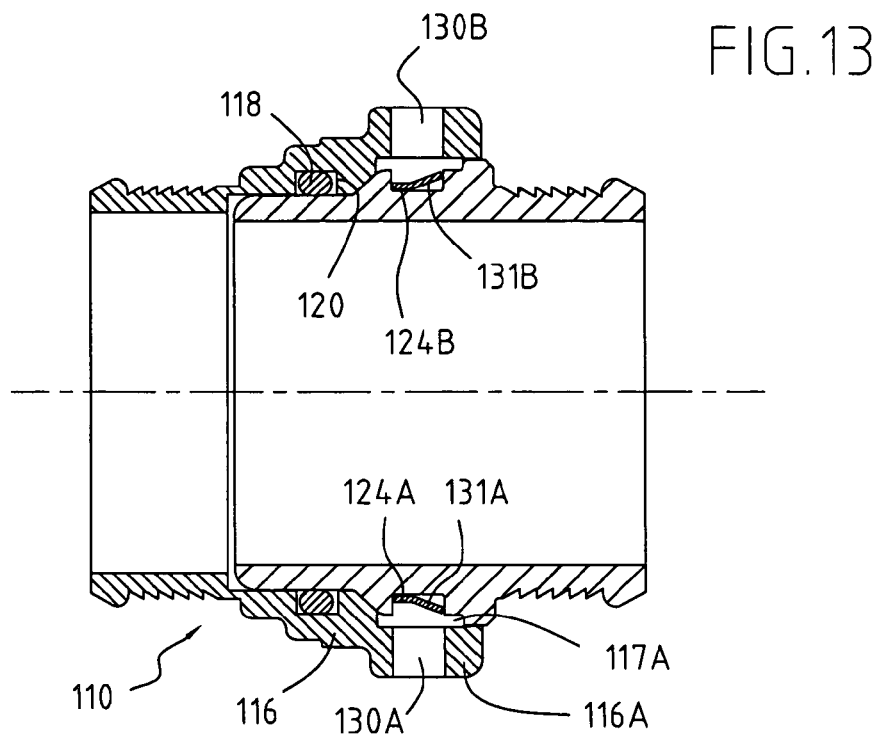
FIG. 13 is an axial section view on line XIII-XIII of FIG. 11.
Figure 12:
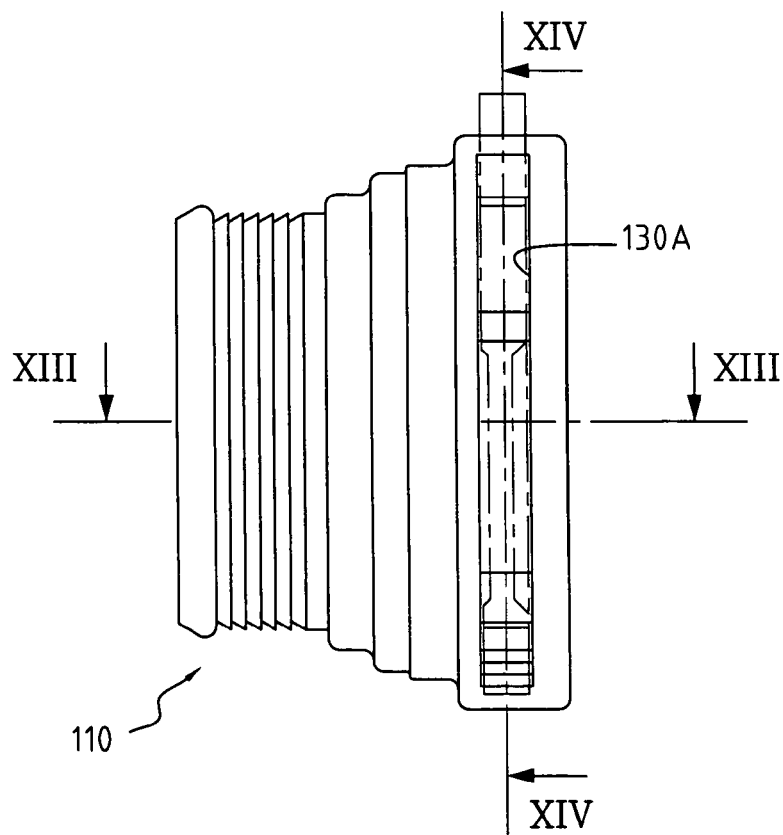
FIG. 12 is a side view of the coupling of FIG. 11.

The variant embodiment shown in FIGS. 11 to 16 is described below. In this variant embodiment, elements that are analogous to the elements of the preceding figures are given like references, plus 100. The clip 122 is U-shaped in overall shape, with a bridge 126, two locking zones 124A and 124B formed on its branches 123A and 123B and free ends 125A and 125B folded back inwards. As can be seen in FIG. 11, said free ends are even folded back towards the bridge 126.

The push unlocking zones 135A and 135B of the clip 122 are formed by arcuate portions of said clip that are disposed between the locking zones 124A and 124B and the bridge 126. The unlocking zones 137A and 137B of the clip are disposed between the ends of the locking zones 124A and 124B that are further from the bridge and the free ends 125A and 125B. They are also formed by arcuate portions of the clip.

In this variant embodiment, the width L122 of the clip as measured in the axial direction of the connection, is substantially constant over the entire clip. It can be observed that the transverse edge of the clip that, when said clip is in place in the body 116 of the coupling, is directed towards the free end 116A of said body, presents slight deformations 131A and 131B which form ramps facilitating inserting the tube into coupling while said coupling is being fitted onto the tube.

The body of the coupling is provided with two diametrically opposite slots 130A and 130B which open out into the first portion 117A of the cavity and which extend transversely relative to the axial direction of the coupling. As can be seen in particular in FIGS. 11 and 14, the outside wall of the coupling is provided with two setbacks, respectively 132A and 132B provided in the vicinities of the top ends of the slots 130A and 130B.

It is also provided with two setbacks 136A and 136B provided in the vicinities of the bottom ends of said slots.

Unlike in the embodiment shown in FIG. 1 to 7, the bottoms of said setbacks are entirely uninterrupted. In other words, the push unlocking ramps 134A and 134B and the pull unlocking ramps 138A and 138B are not formed by edges of the slots, but rather by the uninterrupted bottoms of the setbacks 132A and 136A between which the slots 130A extends and of the setbacks 132B and 136B between which the slot 130B extends.

The bottoms of said setbacks form circular arcs (intersecting a transverse plane) of curvature matching the arcuate shapes of the unlocking zones 135A, 135B, 137A, and 137B of the clip 22.

The bridge 126 is further away from the locking zones 124A and 124B than the bridge 26 of the clip shown in FIGS. 1 to 7 is from the locking zones 24A and 24B of that clip It is necessary for the unlocking zones 135A and 135B to extend over a sufficient length between the bridge 126 and the locking zones 124A and 124B to be capable of sliding on the ramps 132A and 132B during push unlocking, without penetrating into the slots 130A and 130B.

During pull unlocking, as shown in FIG. 16, the folded-back free ends of the clip 125A and 125B penetrate into retaining setbacks which, in this example, are formed by notches 140A and 140B provided in the ramps 138A and 138B. It suffices to push on the bridge 126 in order to disengage the free ends 125A and 125B from said notches and in order to make it possible for the clip to go into its locking configuration shown in FIG. 14.

It should be noted that, in this second embodiment, the setbacks 136A and 136B are accommodation setbacks which receive the free ends 125A, 125B of the clip 122 over their entire stroke between the locking configuration and the unlocking configuration of the clip. In addition, the body 116 of the coupling has a wall element 150 under which the free ends of the clip are disposed. Said wall element protects said free ends and prevents the clip from being separated in untimely manner from the body of the coupling. The radial distance D1 between the wall elements 150 and the ramps 138A and 138B between the notches 140A and 140B is sufficiently large to enable the free ends 125A and 125B to slide freely in the resulting space. Conversely, the radial distance D2 that separates each of the ramps 138A and 138B from the wall element 150 on the other side of the corresponding notch 140A or 140B is less than the distance D1. It is very slightly greater than the height h over which the ends 125A and 125B of the clip are folded back.

Said distance D2 is thus sufficient to enable the free ends of the clip to be inserted into the space provided between the wall element 150 and the ramps 138A and 138B while the clip is being put in place on the body of the coupling, but also sufficiently small so that it is almost impossible to extract said free ends from said space since, in addition, the free ends naturally tend to lodge in the notches 140A and 140B due to the intrinsic resilience of the locking clip.

In this example, the two ramps 138A and 138B meet at an arcuate wall portion between the notches 140A and 140B, under the wall element 150.

The invention claimed is:

1. A quick-connect coupling suitable for being fitted axially onto a tube which presents a substantially radial catch surface remote from a free end of the tube, the coupling comprising a body suitable for co-operating with sealing means for establishing a leaktight connection with the tube, and a locking clip which is retained axially relative to the body and which presents at least one locking zone, the clip being such that, starting from a locking configuration in which it is suitable for co-operating with the catch surface of the tube in order to retain said tube, said clip is suitable for being deformed to take up an unlocking configuration, wherein:

the clip is disposed over a wall of the body, said wall being provided with at least one transverse slot through which the locking zone projects into the body when the clip is in the locking configuration, and said wall being provided with at least one setback provided at one end of the slot, said setback having a bottom portion formed on an edge of the slot;

the clip has at least one unlocking zone which is situated at one end of the locking zone and which has an axial width that is greater than an axial width of said locking zone and greater than an axial width of the slot, but less than or equal to an axial width of the setback; and said bottom portion of the setback forms an unlocking ramp on which the unlocking zone is suitable for sliding in order to cause the clip to go from the locking configuration to the unlocking configuration;

and wherein the bottom portion of the setback forming the unlocking ramp is provided on the edge of the slot, on both sides thereof, and the unlocking zone of the clip extends axially on both sides of the locking zone.

2. A coupling according to claim 1 wherein the width of the locking zone is at the most substantially equal to one half of the width of the unlocking zone.

3. A coupling according to claim 1, wherein the body of the coupling presents two transverse slots situated facing each other, at least one setback whose bottom portion forms an unlocking ramp being provided at one end of each of said transverse slots, while the clip presents two locking zones, each of which is engaged in one of said transverse slots, and at least one unlocking zone for each locking zone.

4. A coupling according to claim 3, wherein the width of the locking zone is at the most substantially equal to one half of the width of the unlocking zone.

5. A coupling according to claim 3, wherein the clip is formed from a strip of metal, the locking zone being formed by a region of said strip in which two strip portions situated on either side of a fold extending along the length of the strip are folded over one against the other.

6. A coupling according to claim 1, wherein the clip comprises two branches interconnected by a bridge, and presents two locking zones situated on respective ones of said branches, and at least two pull unlocking zones, each of which is situated on the other side of a locking zone from the side on which the bridge is situated, while the body of the coupling presents two pull unlocking ramps on which said pull unlocking zones are suitable for sliding in order to bring the clip into a pull unlocking configuration when traction is exerted on the bridge.

7. A coupling according to claim 1, wherein the clip is substantially U-shaped and has two branches which are terminated by free ends and which are interconnected by a bridge opposite from said ends.

8. A coupling according to claim 1, wherein the clip is suitable for presenting a pull unlocking configuration into which it is brought, from the locking configuration, by traction being exerted substantially in a transverse plane, and the coupling has means for limiting the extent to which the clip can be moved by pulling.

9. A coupling according to claim 8 wherein at least one of the unlocking configurations is a stable configuration, the coupling having means for holding the clip in the stable configuration.

10. A coupling according to claim 9, wherein the free ends of the clip are folded back, and wherein wall of the body of the coupling is provided with retaining setbacks in which said folded-back free ends are retained in the pull unlocking configuration.

11. A quick-connect coupling suitable for being fitted axially onto a tube which presents a substantially radial catch surface remote from a free end of the tube, the coupling comprising a body suitable for co-operating with sealing means for establishing a leaktight connection with the tube, and a locking clip which is retained axially relative to the body and which presents at least one locking zone, the clip being such that, starting from a locking configuration in which it is suitable for co-operating with the catch surface of the tube in order to retain said tube, said clip is suitable for being deformed to take up an unlocking configuration, wherein:

the clip is disposed over a wall of the body, said wall being provided with at least one transverse slot through which the locking zone projects into the body when the clip is in the locking configuration, and said wall being provided with at least one setback provided at one end of the slot, said setback having a bottom portion formed on an edge of the slot;

the clip has at least one unlocking zone which is situated at one end of the locking zone and which has an axial width that is greater than an axial width of said locking zone and greater than an axial width of the slot, but less than or equal to an axial width of the setback; and said bottom portion of the setback forms an unlocking ramp on which the unlocking zone is suitable for sliding in order to cause the clip to go from the locking configuration to the unlocking configuration; and wherein the clip is formed from a strip of metal, the locking zone being formed by a region of said strip in which two strip portions situated on either side of a fold extending along the length of the strip are folded over one against the other.

12. A quick-connect coupling suitable for being fitted axially onto a tube which presents a substantially radial catch surface remote from a free end of the tube, the coupling comprising a body suitable for co-operating with sealing means for establishing a leaktight connection with the tube, and a locking clip which is retained axially relative to the body and which presents at least one locking zone, the clip being such that, starting from a locking configuration in which it is suitable for co-operating with the catch surface of the tube in order to retain said tube, said clip is suitable for being deformed to take up an unlocking configuration, wherein:

the clip is disposed over a wall of the body, said wall being provided with at least one transverse slot through which the locking zone projects into the body when the clip is in the locking configuration, and said wall being provided with at least one setback provided at one end of the slot, said setback having a bottom portion formed on an edge of the slot;

the clip has at least one unlocking zone which is situated at one end of the locking zone and which has an axial width that is greater than an axial width of said locking zone and greater than an axial width of the slot, but less than or equal to an axial width of the setback; and said bottom portion of the setback forms an unlocking ramp on which the unlocking zone is suitable for sliding in order to cause the clip to go from the locking configuration to the unlocking configuration; and wherein the clip is formed from a metal wire, at least a portion of which is flattened to define the locking zone.

13. A quick-connect coupling suitable for being fitted axially onto a tube which presents a substantially radial catch surface remote from a free end of the tube, the coupling comprising a body suitable for co-operating with sealing means for establishing a leaktight connection with the tube, and a locking clip which is retained axially relative to the body and which presents at least one locking zone, the clip being such that, starting from a locking configuration in which it is suitable for co-operating with the catch surface of the tube in order to retain said tube, said clip is suitable for being deformed to take up an unlocking configuration, wherein:

the clip is disposed over a wall of the body, said wall being provided with at least one transverse slot through which the locking zone projects into the body when the clip is in the locking configuration, and said wall being provided with at least one setback provided at one end of the slot, said setback having a bottom portion formed on an edge of the slot;

the clip has at least one unlocking zone which is situated at one end of the locking zone and which has an axial width that is greater than an axial width of said locking zone and greater than an axial width of the slot, but less than or equal to an axial width of the setback; and said bottom portion of the setback forms an unlocking ramp on which the unlocking zone is suitable for sliding in order to cause the clip to go from the locking configuration to the unlocking configuration; and wherein:

the clip presents at least one additional unlocking zone situated at another end of the locking zone;

at least one additional unlocking ramp is provided at the other end of the slot; and the unlocking zone is suitable for sliding on the unlocking ramp so as to cause the clip to go into a first unlocking configuration, while the at least one additional unlocking zone is suitable for sliding on the at least one additional unlocking ramp so as to cause the clip to go into a second unlocking configuration.

14. A quick-connect coupling suitable for being fitted axially onto a tube which presents a substantially radial catch surface remote from a free end of the tube, the coupling comprising a body suitable for co-operating with sealing means for establishing a leaktight connection with the tube, and a locking clip which is retained axially relative to the body and which presents at least one locking zone, the clip being such that, staffing from a locking configuration in which it is suitable for co-operating with the catch surface of the tube in order to retain said tube, said clip is suitable for being deformed to take up an unlocking configuration, wherein:

the clip is disposed over a wall of the body, said wall being provided with at least one transverse slot through which the locking zone projects into the body when the clip is in the locking configuration, and said wall being provided with at least one setback provided at one end of the slot, said setback having a bottom portion formed on an edge of the slot;

the clip has at least one unlocking zone which is situated at one end of the locking zone and which has an axial width that is greater than an axial width of said locking zone and greater than an axial width of the slot, but less than or equal to an axial width of the setback; and said bottom portion of the setback forms an unlocking ramp on which the unlocking zone is suitable for sliding in order to cause the clip to go from the locking configuration to the unlocking configuration; and wherein the clip comprises two branches interconnected by a bridge which projects radially relative to the body of the coupling when the clip is in the locking configuration, said clip presenting two locking zones situated on respective ones of the branches thereof and at least two push unlocking zones, each of which is situated between a locking zone and the bridge, while the body of the coupling presents two push unlocking ramps on which said push unlocking zones are suitable for sliding in order to bring the clip into a push unlocking configuration when pressure is exerted on the bridge.

15. A coupling according to claim 14, wherein the clip comprises two branches (interconnected by a bridge, and presents two locking zones situated on respective ones of said branches, and at least two pull unlocking zones, each of which is situated on the other side of a locking zone from the side on which the bridge is situated, while the body of the coupling presents two pull unlocking ramps on which said pull unlocking zones are suitable for sliding in order to bring the clip into a pull unlocking configuration when traction is exerted on the bridge.

16. A quick-connect coupling suitable for being fitted axially onto a tube which presents a substantially radial catch surface remote from a free end of the tube, the coupling comprising:

a body suitable for co-operating with sealing means for establishing a leaktight connection with the tube; and a locking clip which is retained axially relative to the body and which comprises two branches interconnected by a bridge, each of said branches being provided with a locking zone, wherein:

said clip is constructed such that, starting from a locking configuration in which the bridge projects radially towards an outside of the body of the coupling and in which said locking zones project into the body and are suitable for co-operating with the catch surface of the tube in order to retain said tube;

said clip is suitable for being deformed elastically by means of pressure being exerted on the bridge to take up a push unlocking configuration in which said branches are driven apart;

the clip is disposed over the wall of the body, which wall is provided with two transverse slots, through each of which one of the locking zones projects into the body when the clip is in the locking configuration;

for each slot, the body presents a push unlocking ramp situated at one end of the slot and a pull unlocking ramp situated at another end of the slot, and, for each locking zone, the clip presents a push unlocking zone situated at one end of the locking zone of the bridge and a pull unlocking zone situated at another end of the locking zone; and starting from said locking configuration, the clip is suitable for being elastically deformed by pressure being exerted on the bridge so as to take up said push unlocking configuration by sliding the push unlocking zones on the push unlocking ramps, and for being elastically deformed by fraction being exerted on the bridge so as to take up, in addition, a pull unlocking configuration by sliding the pull unlocking zones on the pull unlocking ramps;

and wherein the bottom portion of the setback forming the unlocking ramp is provided on the edge of the slot, on both sides thereof, and the push and pull unlocking zones of the clip extends axially on both sides of the locking zone.

17. A coupling according to claim 16, wherein the clip is substantially U-shaped, and has two branches which are terminated by free ends and which are interconnected by said bridge which is opposite from said free ends.

18. A coupling according to claim 16, wherein the body of the coupling is provided with accommodation setbacks in which the free ends of the clip are received over entire strokes of the free ends between the locking configuration and the unlocking configuration of the clip.

19. A coupling according to claim 18, wherein the body of the coupling has a wall element under which the free ends of the clip are disposed.

20. A quick-connect coupling suitable for being fitted axially onto a tube which presents a substantially radial catch surface remote from a free end of the tube, the coupling comprising:

a body suitable for co-operating with sealing means for establishing a leaktight connection with the tube; and a locking clip which is retained axially relative to the body and which comprises two branches interconnected by a bridge, each of said branches being provided with a locking zone, wherein:

said clip is constructed such that, starting from a locking configuration in which the bridge projects radially towards an outside of the body of the coupling and in which said locking zones project into the body and are suitable for co-operating with the catch surface of the tube in order to retain said tube;

said clip is suitable for being deformed elastically by means of pressure being exerted on the bridge to take up a push unlocking configuration in which said branches are driven apart;

the clip is disposed over the wall of the body, which wall is provided with two transverse slots, through each of which one of the locking zones projects into the body when the clip is in the locking configuration;

for each slot, the body presents a push unlocking ramp situated at one end of the slot and a pull unlocking ramp situated at another end of the slot, and, for each locking zone, the clip presents a push unlocking zone situated at one end of the locking zone of the bridge and a pull unlocking zone situated at another end of the locking zone; and starting from said locking configuration, the clip is suitable for being elastically deformed by pressure being exerted on the bridge so as to take up said push unlocking configuration by sliding the push unlocking zones on the push unlocking ramps, and for being elastically deformed by traction being exerted on the bridge so as to take up, in addition, a pull unlocking configuration by sliding the pull unlocking zones on the pull unlocking ramps; and wherein the clip is formed from a strip of metal, the locking zone being formed by a region of said strip in which two strip portions situated on either side of a fold extending along the length of the strip are folded over one against the other.

* * * * *